(12) United States Patent
Stroila et al.

(10) Patent No.: US 11,770,682 B2
(45) Date of Patent: Sep. 26, 2023

(54) VEHICLE COMMUTE LOCATION PATTERNS BASED ON USER LOCATION DATA

(71) Applicant: Allstate Insurance Company, Northbrook, IL (US)

(72) Inventors: Matei Stroila, Chicago, IL (US); Narayanan Alwar, Bloomingdale, IL (US); Timothy W. Gibson, Barrington, IL (US); Sunil Chintakindi, Naperville, IL (US)

(73) Assignee: Allstate Insurance Company, Northbrook, IL (US)

( * ) Notice: Subject to any disclaimer, the term of this patent is extended or adjusted under 35 U.S.C. 154(b) by 132 days.

(21) Appl. No.: 17/404,779

(22) Filed: Aug. 17, 2021

(65) Prior Publication Data

US 2023/0059450 A1 Feb. 23, 2023

(51) Int. Cl.
*H04W 4/02* (2018.01)
*H04W 4/029* (2018.01)
*G06F 16/29* (2019.01)
*H04W 4/021* (2018.01)
*H04W 64/00* (2009.01)

(52) U.S. Cl.
CPC .............. *H04W 4/029* (2018.02); *G06F 16/29* (2019.01); *H04W 4/022* (2013.01); *H04W 64/006* (2013.01)

(58) Field of Classification Search
CPC ...... H04W 4/022; H04W 64/006; G06F 16/29; H04W 4/029
See application file for complete search history.

(56) References Cited

U.S. PATENT DOCUMENTS

| | | | |
|---|---|---|---|
| 8,275,649 B2 | 9/2012 | Zheng et al. | |
| 9,141,582 B1 | 9/2015 | Brinkmann et al. | |
| 9,696,175 B2* | 7/2017 | Hansen et al. | H04W 4/021 |
| 10,831,827 B2 | 11/2020 | Gifford et al. | |
| 2002/0173905 A1* | 11/2002 | Jin et al. | G08G 1/096861 |
| | | | 701/408 |

(Continued)

OTHER PUBLICATIONS

International Search Report and Written Opinion of The. International Searching Authority for dated Nov. 21, 2022 for International Application No. PCT/US2022/040577 filed Aug. 17, 2022 (13 pages).

(Continued)

*Primary Examiner* — Dai Phuong
(74) *Attorney, Agent, or Firm* — Polsinelli PC (57) ABSTRACT

Methods, computer-readable media, software, and system may generally identify, determine, and understand the significance of commute location data using telematics data. The system and methods may identify significant commute location data and points by analyzing telematics data and capturing GPS locations associated with the mobility of a user. The commute location data may be classified as data points including origin, destination, and waypoints. This commute location data may be used with metadata to identify significant locations associated with the user. The commute location data may also be used with metadata to understand mobility behavior of the user. Lastly, the commute location data may be used with metadata to determine risk associated with the user, such as based on a risk map.

20 Claims, 9 Drawing Sheets

(56) References Cited

U.S. PATENT DOCUMENTS

| | | | |
|---|---|---|---|
| 2013/0117321 A1* | 5/2013 | Fischer et al. | G01C 21/32 |
| | | | 707/792 |
| 2016/0069697 A1* | 3/2016 | Oel et al. | G01C 21/3682 |
| | | | 701/426 |
| 2017/0184412 A1* | 6/2017 | Yamaguchi | G01C 21/362 |
| 2020/0286391 A1 | 9/2020 | Beaurepaire et al. | |
| 2021/0041252 A1* | 2/2021 | Huang et al. | G01C 21/3438 |

OTHER PUBLICATIONS

Weidner, W., Transchel, F., & Weidner, R. (2017). Telematic driving profile classification in car insurance pricing. Annals of Actuarial Science, 11(2), 213-236. doi:10.1017/S1748499516000130.

* cited by examiner

VEHICLE COMMUTE LOCATION PATTERNS BASED ON USER LOCATION DATA

FIELD OF ART

Aspects of the disclosure relate generally to mobility patterns, more specifically, classifying commute locations based on user location data to enhance risk modeling.

BACKGROUND

Location data collected using a telematics solution consists in a series of Global Positioning System (GPS) locations that describe the mobility of the user. These points can be classified as commute location data into Origin, Waypoints, and Destination. As the name implies, Origin and Destination refer to the start and end points of a trip, while the series of waypoints are the interim destinations along the route. There may be a need for identifying significant locations in mobility data, understanding the mobility behavior, and thus understanding and estimating risk in combination with a risk map.

Aspects described herein may address these and other problems, and generally classifying destination locations and/or commute locations and inferences that can be derived from the classification to enhance risk modeling and price estimation for the insurance industry. Aspects described herein may be utilized for the insurance industry to understand a customer's mobility risks, but may be also extendable for several other industries and applications.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In some aspects, the system may comprise: a processor; a display with a user interface; and a memory unit storing computer-executable instructions. The computer-executable instruction, which when executed by the processor, may cause the system to: receive and determine commute location data that includes a plurality of trips by a user between a plurality of origins, a plurality of destinations, and a plurality of waypoints in between each of the corresponding origins and destinations; aggregate the commute location data; cluster the aggregated commute location data using one or more hierarchical cluster levels; form, by a machine learning algorithm operating on the processor, one or more location clusters into a plurality of commute locations from the aggregated commute location data and based on the one or more hierarchical cluster levels; filter, using a temporal filter, the plurality of commute locations, into one or more temporal classifications; generate a commute location map that includes a plurality of location icons; determine a risk index for the user based on the commute location map and a risk map, wherein the risk index is used for insurance pricing for the user; and display, via the user interface, the commute location map and the risk index for the user. Each of the plurality of location icons may represent each of the temporal filtered plurality of commute locations. The plurality of commute locations may be defined from the one or more location clusters.

According to some embodiments, the commute location data may be received from one or more sensors from a mobile device for the user. The computer-executable instruction, which when executed by the processor, may also cause the system to detect and filter out noise location data from the commute location data. The noise location data may be defined as inaccuracies from the one or more sensors and the commute location data. The one or more temporal classifications may include filtering the plurality of commute locations based on a time of day window for each of the plurality of commute locations. The time of day window may include morning, day, evening, and night. The one or more temporal classifications may include filtering the plurality of commute locations based on a minimum number of visits per time period to each of the plurality of commute locations. The one or more temporal classifications may include filtering the plurality of commute locations based on a maximum time of stay at each of the plurality of commute locations. The one or more hierarchical cluster levels may include one or more of the following: a destination-based cluster level, a spatial aggregation layer cluster level, a temporal cluster level, a point of interest based cluster level, or a regional cluster level. Each of the location icons for the plurality of commute locations may include a size that is proportional to a location frequency that the user visits a specific location associated with each of the plurality of commute locations. The size may be larger when the location frequency is more frequent and the size may be smaller when the location frequency is less frequent. Each of the location icons for the plurality of commute locations may include a color that represents a distance the users are commuting to these commute locations. The color may include a first color and a second color different from the first color, with the first color defining a shorter distance to the commute location and the second color defining a longer distance to the commute location.

Additionally, a variety of aspects described herein provide a computer-implemented method and/or one or more non-transitory computer-readable media storing instructions that, when executed by a computing device, cause the computing device to: receive and determine, by a processor operating on the computing device, commute location data; aggregate, by the processor, the commute location data; cluster, by the processor, the aggregated commute location data using one or more hierarchical cluster levels; form, by a machine learning algorithm operating on the processor, one or more location clusters into a plurality of commute locations from the aggregated commute location data and based on the one or more hierarchical cluster levels; filter, using a temporal filter, the plurality of commute locations, into one or more temporal classifications; generate, by the processor, a commute location map that includes a plurality of location icons; determine a risk index for the user based on the commute location map and a risk map; and display, by the processor via a user interface connected to the processor, the commute location map and the risk index for the user. The commute location data may be received from one or more sensors from a mobile device for the user. The commute location data may include a plurality of trips by a user between a plurality of origins, a plurality of destinations, and a plurality of waypoints in between each of the corresponding origins and destinations. The one or more temporal classifications may include one or more of: filtering the plurality of commute locations based on a time of day window for each of the plurality of commute locations, filtering the plurality of commute locations based on a minimum number of visits per time period to each of the plurality of commute locations, or filtering the plurality of commute locations based on a maximum time of stay at each of the plurality of commute locations. The one or more hierarchical cluster levels may include one or more of the following: a destination-based cluster level, a spatial aggregation layer cluster level, a temporal cluster level, a point of interest based cluster level, or a regional cluster level. Each of the plurality of location icons may represent each of the temporal filtered plurality of commute locations. The plurality of commute locations may be defined from the one or more location clusters. Each of the location icons for the plurality of commute locations may include a size that is proportional to a location frequency that the user visits a specific location associated with each of the plurality of commute locations. The size may be larger when the location frequency is more frequent and the size may be smaller when the location frequency is less frequent. The risk index may be used for insurance pricing for the user.

The methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims. These features, along with many others, are discussed in greater detail below.

BRIEF DESCRIPTION OF THE DRAWINGS

The present invention is illustrated by way of example and is not limited by the accompanying figures in which like reference numerals indicate similar elements and in which.

DETAILED DESCRIPTION

In accordance with various aspects of the disclosure, methods, computer-readable media, software, and apparatuses are disclosed for classifying destination locations and/or commute locations and inferences that can be derived from the classification to enhance risk modeling and price estimation for the insurance industry.

In the following description of the various embodiments of the disclosure, reference is made to the accompanying drawings, which form a part hereof, and in which is shown by way of illustration, various embodiments in which the disclosure may be practiced. It is to be understood that other embodiments may be utilized and structural and functional modifications may be made.

Aspects of the disclosure address one or more of the issues mentioned above by disclosing methods, computer readable storage media, software, systems, and apparatuses for identifying, determining, and understanding the significance of commute location data using telematics data. The system may identify significant commute location data and points by analyzing telematics data and capturing GPS locations associated with the mobility of a user. The commute location data may be classified as data points including "origin," "destination," and "waypoints." Each of these commute location data points can be used for uniquely understanding the user mobility behavior. This commute location data may be used with metadata to identify significant locations associated with the user. The commute location data may also be used with metadata to understand mobility behavior of the user. Lastly, the commute location data may be used with metadata to determine risk associated with the user, such as based on a risk map.

Figure 1:
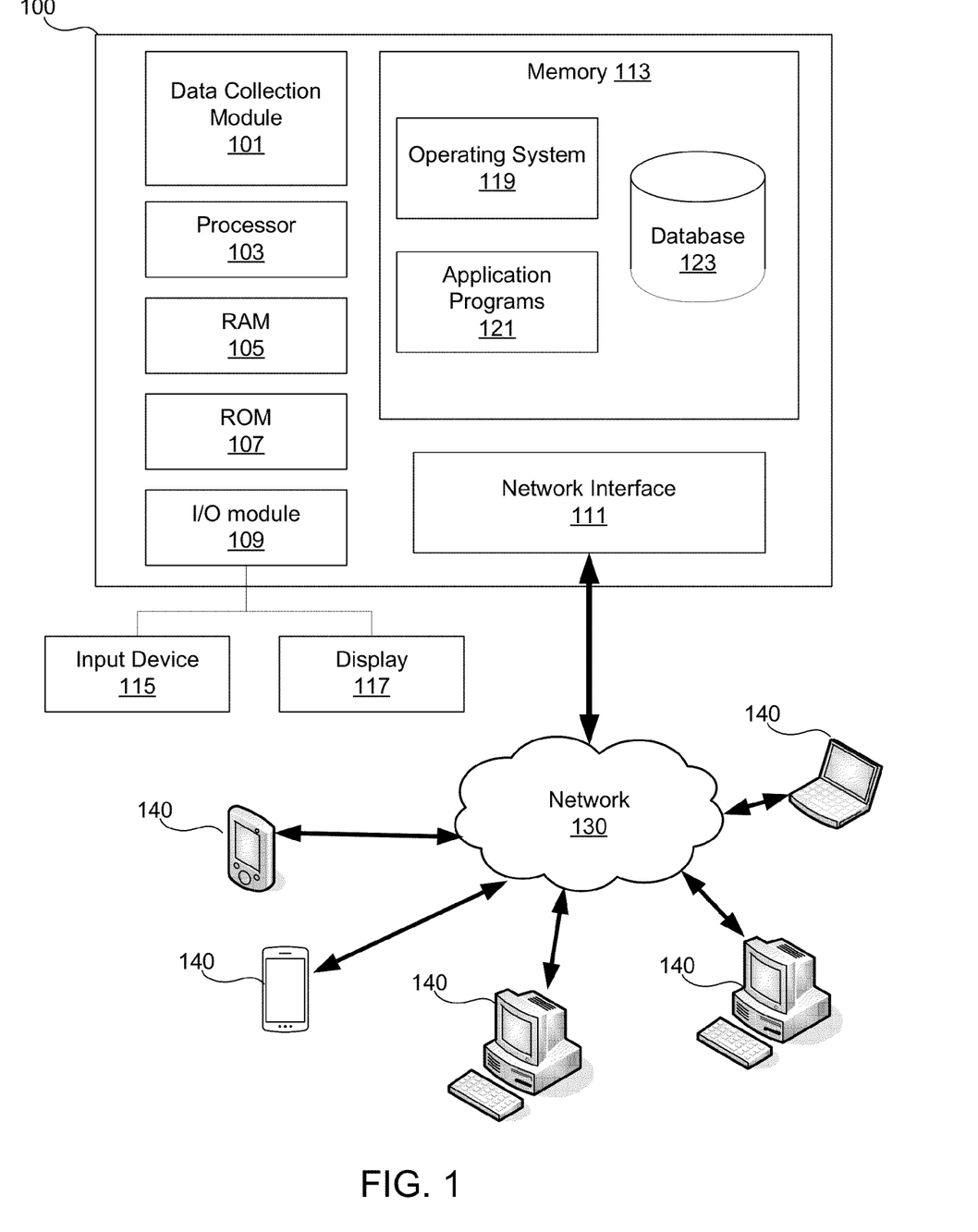
FIG. 1 illustrates an example computing device that may be used in accordance with one or more aspects described herein.

In one or more arrangements, aspects of the present disclosure may be implemented with a computing device. FIG. 1 illustrates a block diagram of an example mobility pattern server 100 that may be used in accordance with aspects described herein to determine and identify the significance of commute location data using telematics data. The mobility pattern server 100 may be a server, personal computer (e.g., a desktop computer), laptop computer, notebook, tablet, smartphone, home management devices, home security devices, smart appliances, etc. The mobility pattern server 100 may have a data collection module 101 for retrieving and/or analyzing commute location data as described herein. The data collection module 101 may be implemented with one or more processors and one or more storage units (e.g., databases, RAM, ROM, and other computer-readable media), one or more application specific integrated circuits (ASICs), and/or other hardware components (e.g., resistors, capacitors, power sources, switches, multiplexers, transistors, inverters, etc.). Throughout this disclosure, the data collection module 101 may refer to the software and/or hardware and/or applications used to implement the data collection module 101. In cases where the data collection module 101 includes one or more processors, such processors may be specially configured to perform the processes disclosed herein. Additionally, or alternatively, the data collection module 101 may include one or more processors configured to execute computer-executable instructions, which may be stored on a storage medium, to perform the processes disclosed herein. In some examples, mobility pattern server 100 may include one or more processors 103 in addition to, or instead of, the data collection module 101. The processor(s) 103 may be configured to operate in conjunction with data collection module 101. Both the data collection module 101 and the processor(s) 103 may be capable of controlling operations of the mobility pattern server 100 and its associated components, including RAM 105, ROM 107, an input/output (I/O) module 109, a network interface 111, and memory 113. For example, the data collection module 101 and processor(s) 103 may each be configured to read/write computer-executable instructions and other values from/to the RAM 105, ROM 107, and memory 113. Processor 103 may include one or more computer processing units (CPUs), graphical processing units (GPUs), and/or other processing units such as a processor adapted to perform computations associated with machine learning and machine learning algorithms.

The I/O module 109 may be configured to be connected to an input device 115, such as a microphone, keypad, keyboard, touchscreen, and/or stylus through which a user of the computing device 100 may provide input data. The I/O module 109 may also be configured to be connected to a display device 117, such as a monitor, television, touchscreen, etc., and may include a graphics card. The display device 117 and input device 115 are shown as separate elements from the computing device 100; however, they may be within the same structure. On some computing devices 100, the input device 115 may be operated by users to interact with the data collection module 101, including providing user information and/or preferences, account information, vehicle sharing requests and/or offers, etc., as described in further detail below. System administrators may use the input device 115 to make updates to the data collection module 101, such as software updates. Meanwhile, the display device 117 may assist the system administrators and users to confirm/appreciate their inputs.

The memory 113 may be any computer-readable medium for storing computer-executable instructions (e.g., software). The instructions stored within memory 113 may enable the computing device 100 to perform various functions. For example, memory 113 may store software used by the computing device 100, such as an operating system 119 and application programs 121, and may include one or more associated databases 123.

Memory 113 may store software for configuring mobility pattern server 100 into a special purpose computing device in order to perform one or more of the various functions discussed herein. Memory 113 may store operating system software 119 for controlling overall operation of the mobility pattern server 100 or application programs 121 for instructing mobility pattern server 100 to perform aspects discussed herein.

The network interface 111 may allow the computing device 100 to connect to and communicate with a network 130. The network 130 may be any type of network, including a local area network (LAN) and/or a wide area network (WAN), such as the Internet, a cellular network, or a satellite network. Through the network 130, the computing device 100 may communicate with one or more other mobile computing devices 140, such as laptops, notebooks, smartphones, cell phones, tablets, personal computers, in-vehicle devices, servers, vehicles, home management devices, home security devices, smart appliances, etc. The mobile computing devices 140 may be configured to operate software and/or applications. The mobile computing devices 140 may also be configured in a similar manner as computing device 100. In some embodiments the computing device 100 may be connected to the mobile computing devices 140 to form a "cloud" computing environment.

Devices 140 may have similar or different architecture as described with respect to the mobility pattern server 100. Those of skill in the art will appreciate that the functionality of the mobility pattern server 100 (or device 140) as described herein may be spread across multiple data processing devices, for example, to distribute processing load across multiple computers, to segregate transactions based on geographic location, user access level, quality of service (QoS), etc. For example, the mobility pattern server 100 and devices 140, and others may operate in concert to provide parallel computing features in support of the operation of operating systems 119 and/or application programs 119.

The network interface 111 may connect to the network 130 via communication lines, such as coaxial cable, fiber optic cable, etc., or wirelessly using a cellular backhaul or a wireless standard, such as IEEE 802.11, IEEE 802.15, IEEE 802.16, etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other mobile computing devices 140.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
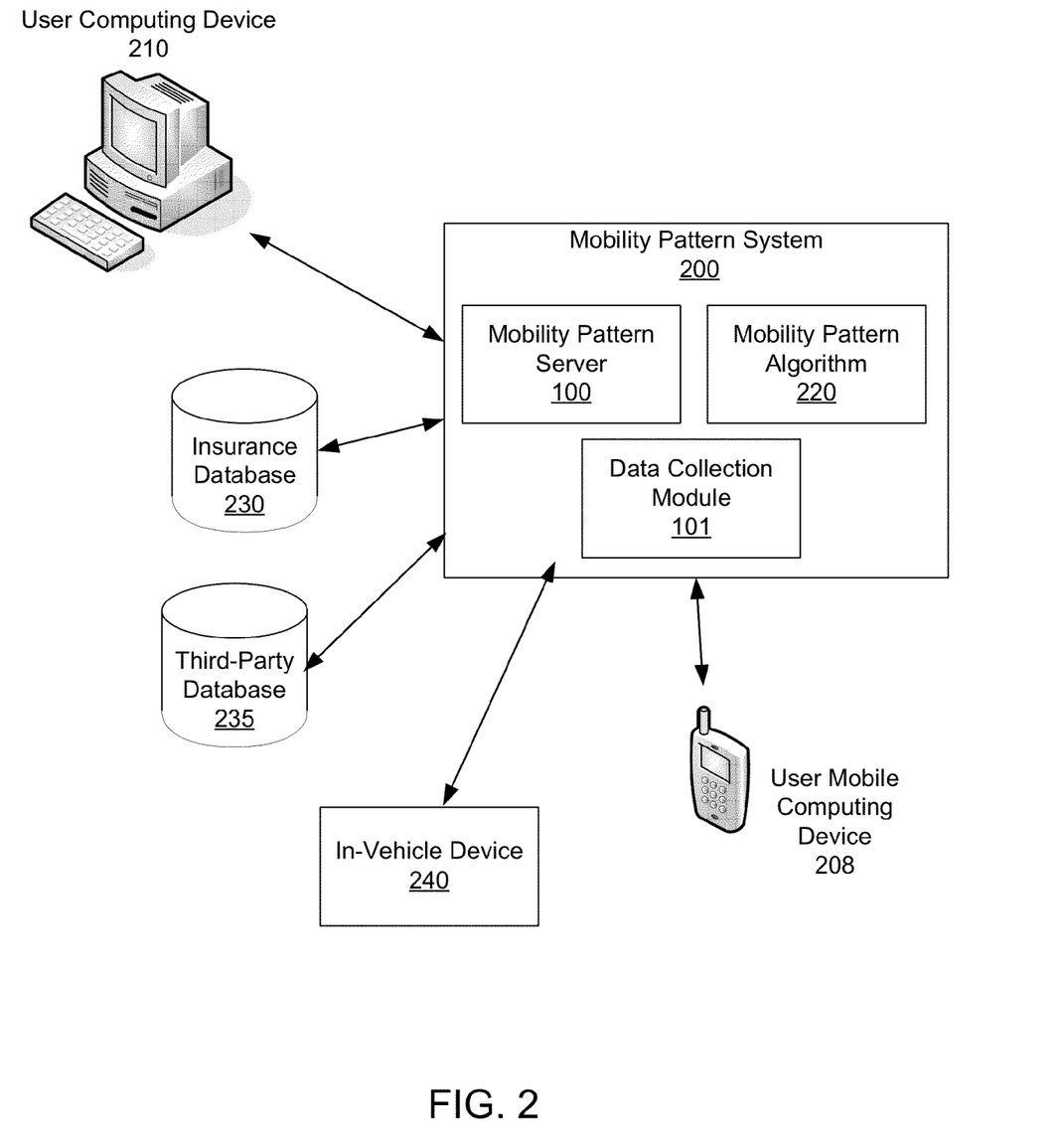
FIG. 2 is a diagram illustrating a mobility pattern system in accordance with one or more aspects described herein.

FIG. 2 is a diagram illustrating a mobility pattern system 200 in accordance with one or more aspects described herein. In some instances, the mobility pattern system 200 may include one or more computing devices, such as mobility pattern server 100 or mobile computing devices 140, or aspects similar to those discussed above with respect to mobility pattern server 100 and mobile computing devices 140. As further illustrated in FIG. 2, the mobility pattern system 200 may include, but not be limited to, the mobility pattern server 100, the data collection module 101, and a mobility pattern algorithm 220. The mobility pattern system 200 and/or mobility pattern server 100 may determine and identify the significance of commute location data using telematics data.

The mobility pattern system 200 may include a mobility pattern algorithm 220 that may execute or operate on the mobility pattern server 100. The mobility pattern algorithm 220 may be a machine learning algorithm. The mobility pattern system 200 may utilize a mobility pattern algorithm 220 for forming the one or more location clusters in a plurality of nodes and/or a plurality of edges from aggregated location data from a user or a group of users. The mobility pattern algorithm 220 may provide data munging, parsing, and machine learning models to help determine a resale value of a vehicle. The mobility pattern algorithm 220 may utilize one or more of a variety of machine learning architectures known and used in the art. These architectures can include, but are not limited to, linear regression, random forest, decision trees, k-nearest neighbors, support vector machines (SVM), logistical regression, k-means clustering, association rules, neural networks (NN), recurrent neural networks (RNN), convolutional neural networks (CNN), transformers, and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning architectures can be utilized, more specific machine learning architectures when available, and general machine learning architectures at other times can be used. Additionally, the mobility pattern algorithm 220 may use semi-supervised learning and/or reinforcement learning.

The mobility pattern system 200 may collect location data and additional information from a user through various channels, such as via a user mobile computing device 208, or via a user computing device 210 (e.g., via one or more public or private networks). The mobile computing device 208 and the user computing device 210 may be similar to and include the one or more mobile computing devices 140, such as laptops, notebooks, smartphones, cell phones, tablets, personal computers, in-vehicle devices, servers, vehicles, home management devices, home security devices, smart appliances, etc.

The mobility pattern system 200 may be connected to an in-vehicle device 240. The present disclosure may utilize an in-vehicle device 240 to collect and provide telematics information as known and used in the art on a vehicle. The in-vehicle device 240 may include a processor with a display or graphical interface that receives and/or collects driving data, location data, and/or telematics information and provides additional information based on the driving data. The driving data, location data, and/or telematics information may include, but not be limited to: location, instantaneous velocity, average velocity, route, origin, destination, etc. The in-vehicle device 240, which may be configured to receive real-time vehicle data and location data, may provide a driver or the vehicle owner with visual and/or audible in-vehicle information. The in-vehicle device 240 may process real-time (i.e., near real-time) data and then display the processed information in a meaningful way on a display or graphical user interface (GUI). The in-vehicle device 240 may receive and/or collect critical location data and driving data and store summary information for and/or about the driver.

The in-vehicle device 240 may communicate with the data collection module 101 or on-board diagnostics port of a vehicle to collect the driving data and location data. In another exemplary embodiment, the in-vehicle device 240 may acquire the driving data and location data directly from the device, such as a mobile device, smart phone, tablet computer, or vehicle navigation system via a built-in accelerometer and/or a Global Positioning System (GPS). In another exemplary embodiment, the in-vehicle device 240 may be one in the same device as a mobile device, smart phone, tablet computer, or vehicle navigation system via a built-in accelerometer and/or a Global Positioning System (GPS) to acquire the driving data and location data.

In some arrangements, the mobility pattern system 200 may be connected to an insurance system, such as insurance database 230. The insurance database 230 may include insurance information that may reside on an insurance server regarding information about a vehicle owner or particular user, current insurance policies, current insurance pricing, previous accidents, previous claims, information about other users with similar characteristics, etc. The insurance database 230 may be configured to utilize the insurance information known about the vehicle owner or a particular user and insurance information about users with similar characteristics to provide additional information to the mobility pattern system 200.

In some arrangements, the mobility pattern system 200 may be connected to a third-party database 235. The third-party database 235 may include other information that may be utilized by the mobility pattern system 200 and/or the mobility pattern server 100. For example, the third-party database 235 may include mapping information and/or risk map information.

Generally, a commute location may determine a map location that a user visits periodically (same time period of the day and during specific days of the week) and where the user stays for a certain amount of time. Examples of commute locations are work, gym, school, and places of interest. As an example, a commute location is typically associated with a work location.

Different types of commute locations may be defined by different temporal patterns and attributes. The below listing shows some exemplary parameters that may be used to classify various commute locations; for example, day commute locations, evening commute locations, and night commute locations. Examples of commute locations for day, evening and night may be typical business locations, retail stores, and hospitals respectively. Many other parameters can be used in defining the temporal patterns, such as minimum number of visits per time period (such as per hour, per day, per week, per month, per quarter, or other time period) and/or maximum time of stay.

Day time commuters: Monday-Friday, 7-12 AM, minimum 3 hour stay.

Evening workers: Monday-Friday, 12-6 PM, minimum 3 hour stay.

Night workers: Monday-Friday, 6-10 PM, minimum 6 hour stay.

Generally, the mobility pattern system 200 and/or the mobility pattern server 100 may determine user commute locations from telematics data. The mobility pattern system 200 and/or the mobility pattern server 100 may use various clustering techniques and principles, such as for example, hierarchical spatial-temporal clustering and the attributes assigned to the clusters for various use cases.

The mobility pattern system 200 and/or the mobility pattern server 100 may use a five-level clustering process to combine individual trip destinations into clusters. The mobility pattern system 200 and/or the mobility pattern server 100 may aggregate the user's commute location data and cluster the commute location data hierarchically at different levels.

Figure 3:
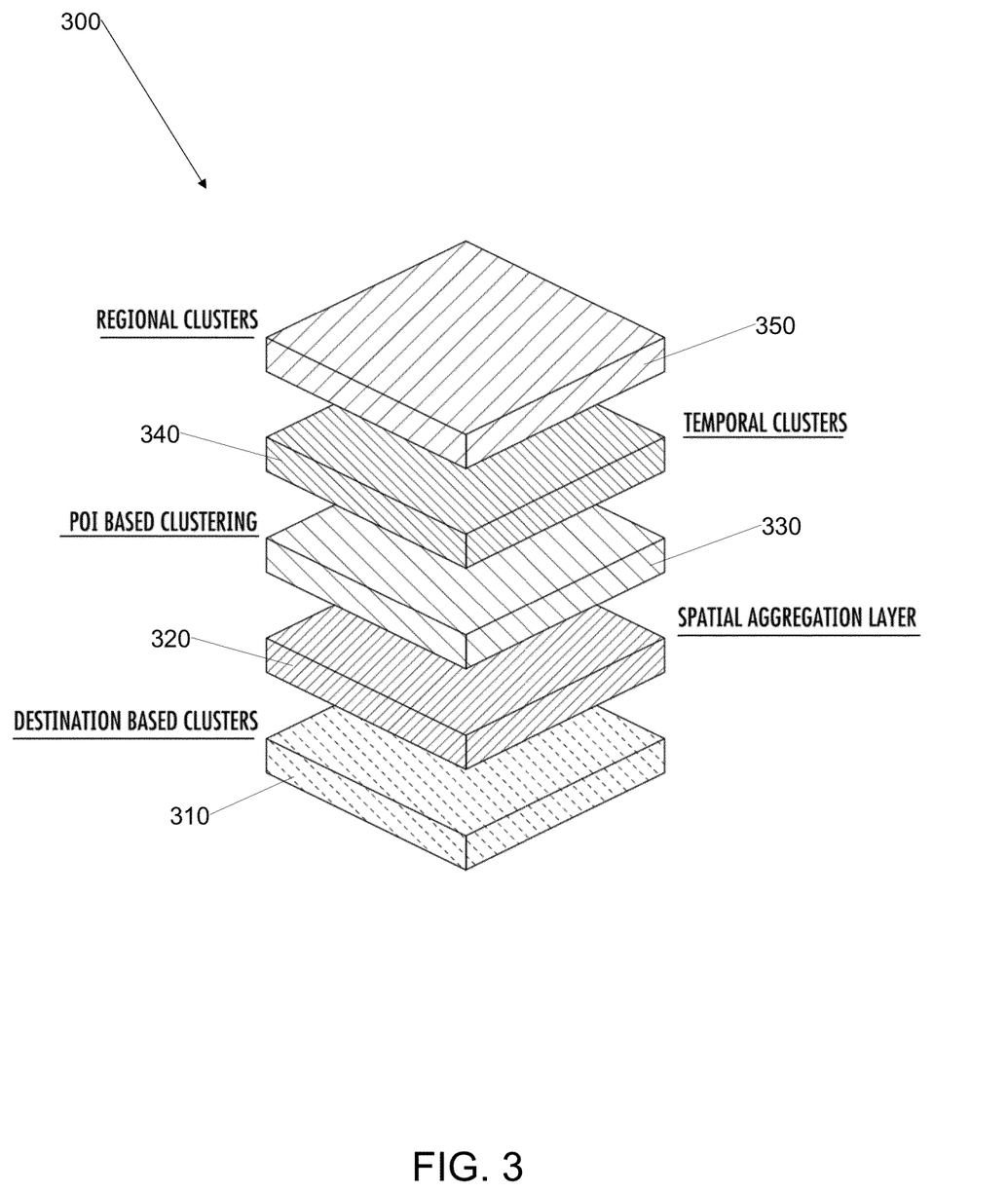
FIG. 3 is a block diagram illustrating various different types of clustering that may be used in the data aggregation stage of the mobility pattern system in accordance with one or more aspects described herein.

The clustering 300 may help to process and analyze the commute location data, specifically related to various challenges associated with variabilities in the real-world data. First, the origin and destination locations may have significant positional errors due to sensor inaccuracies and GPS multipath reflections (blockage due to tall buildings, tunnels, and trees). Due to the inaccuracies from the in-vehicle device 240, the usage behavior of the in-vehicle device 240 and the environments, there may be a large spectrum of positional error in the commute location data. For example, as the in-vehicle device 240 may turn on only when the user is moving at a certain rate for a certain period of time, the trip destinations may be more accurate as compared to the trip origins. The mobility pattern system 200 and/or the mobility pattern server 100 may determine destinations and then attach the origins based on previous destinations or other historical data and/or metadata. The mobility pattern system 200 and/or the mobility pattern server 100 may filter and/or cleanse the commute location data to ensure accurate commute location data. Second, the parking locations for the users may vary widely in different locations in a parking lot or in pick-up/drop-off areas around the destination location. The mobility pattern system 200 and/or mobility pattern server 100 may determine a single location for the parking lot or pick-up/drop-off areas around the destination location. Third, a failure in data capture device, the in-vehicle device 240, or a mobile application may cause some destinations and origins to be placed in the middle of the road or unrealistic locations. The mobility pattern system 200 and/or mobility pattern server 100 may recognize this failure and correct the destination and/or origin to a realistic location. Fourth, there may sometimes be systemic errors introduced by the application software when the data is captured, for example, to protect user privacy. For example, some data capture devices, in-vehicle devices 240, or mobile applications may not start recording the GPS data until the user starts driving at a certain minimum speed. The mobility pattern system 200 and/or mobility pattern server 100 may recognize this systematic error and correct the destination and/or origin to an actual location not based on the user starting driving at a minimum speed.

The mobility pattern system 200 and/or the mobility pattern server 100 may deal with these issues by using a combination of temporal filters, spatial clustering techniques, map data, and user behavior learned using machine learning techniques. FIG. 3 illustrates various different types of clustering 300 that may be used in the data aggregation stage of the mobility pattern system 200 and/or the mobility pattern server 100. The metadata that goes along with each clustering level 400 enables the mobility pattern system 200 and/or the mobility pattern server 100 to build a variety of commute location maps and mobility graphs and derive semantics from this commute location data.

As illustrated in FIG. 3, the various layers of clusters 300 may include destination-based cluster level 310, spatial aggregation layer cluster level 320, point of interest (POI) cluster level 330, temporal cluster level 340, and regional cluster level 350. The various layers or levels of clusters 300 may be hierarchical.

Figure 4A:
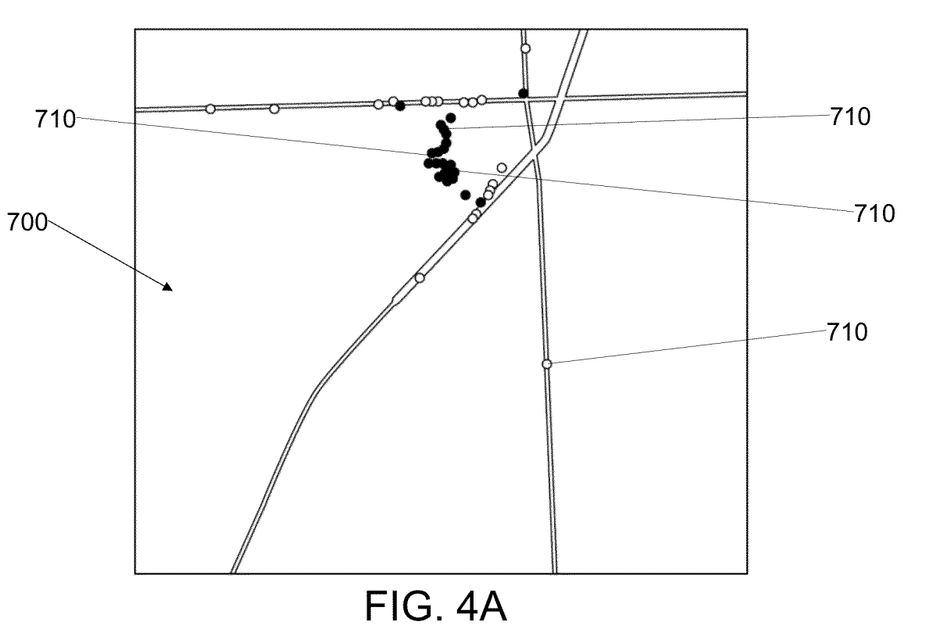
FIGS. 4A and 4B are diagrams illustrating an example of destination-based clusters of the mobility pattern system in accordance with one or more aspects described herein.
Figure 4B:
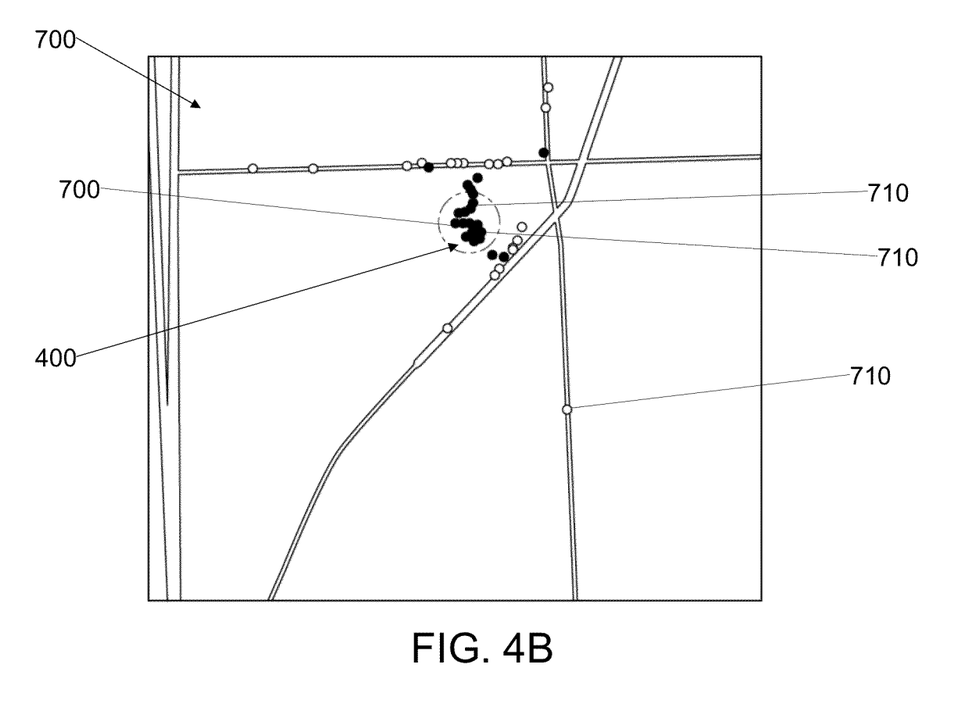

The destination-based cluster level 310 may include clusters that are based on closely spaced destinations within a given radius (e.g. 100 meters) and origins assigned to these destinations. FIGS. 4A and 4B illustrate an example of destination-based clusters 400. For example, FIGS. 4A and 4B illustrates a commute location map 700 or portion of a commute location map 700 with destination-based clustering 400. The commute location map 700 in FIGS. 4A and 4B includes commute locations 710 that are in close proximity and combined to a destination-based cluster 400 using a clustering technique, like density-based spatial clustering of applications with noise (DBSCAN). The destination-based clustering involves consolidating the commute locations 710 or destinations around a particular location of interest into a destination-based cluster 400. The destination-based clustering may allow the mobility pattern system 200 and/or the mobility pattern server 100 to understand the specific purpose of travel around this destination-based cluster 400.

Figure 5:
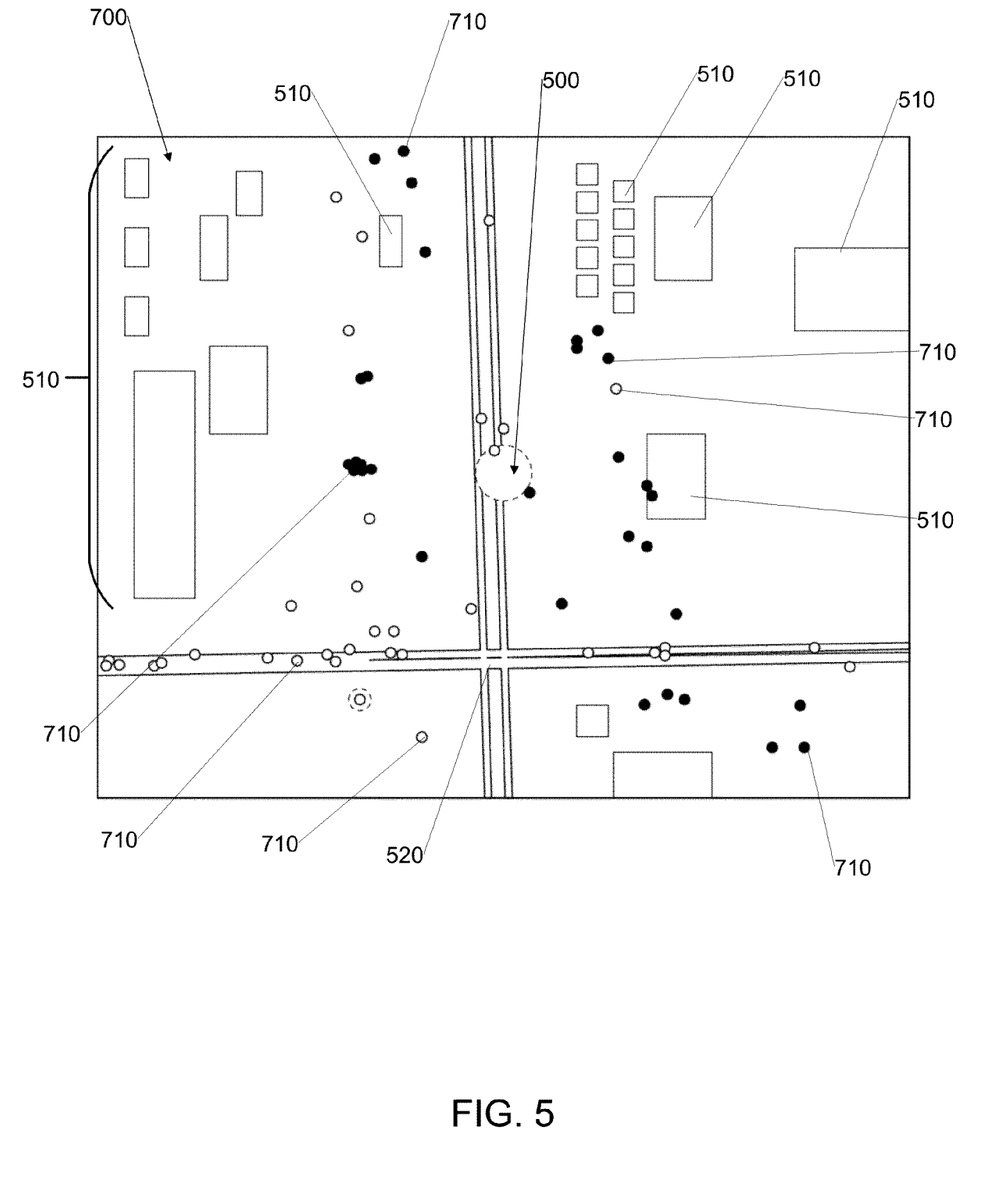
FIG. 5 is a diagram illustrating spatial aggregation layer clustering of the mobility pattern system in accordance with one or more aspects described herein.

FIG. 5 illustrates a commute location map 700 or portion of a commute location map 700 showing spatial aggregation layer clustering 500. The spatial aggregation layer cluster level 320 may include spatial aggregation clusters 500 based on the commute locations 710 and a spatial distance of the destination-based clusters 400. The spatial aggregation clustering level 320 may combine destination-based clusters 400 and may help to identify the users' mobility to a specific region and specifically as spatial aggregation clusters 500. For example, the mobility pattern system 200 and/or the mobility pattern server 100 may identify users travelling to spatial aggregation clusters 500, such as a strip mall 510 or an intersection 520 of several commercial outlets in this layer. The spatial aggregation clusters 500 may allow the mobility pattern system 200 and/or the mobility pattern server 100 to understand the user's mobility to the town or region of user's neighborhood. FIG. 5 illustrates this example of higher level spatial clustering aggregation.

Figure 6A:
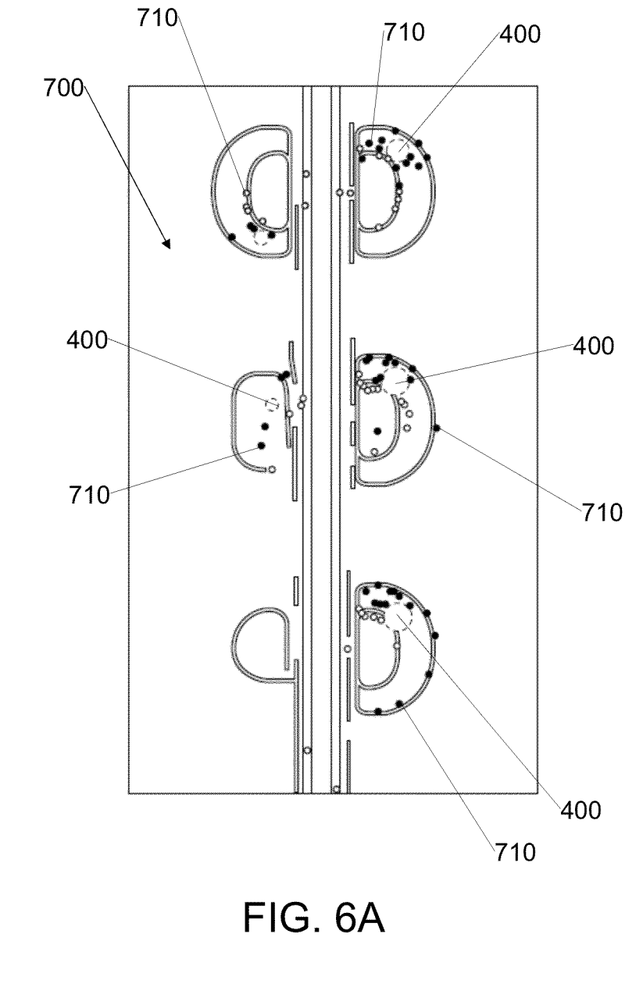
FIGS. 6A and 6B are diagrams illustrating a mobility graph showing points of interest (POI) clustering of the mobility pattern system in accordance with one or more aspects described herein.
Figure 6B:
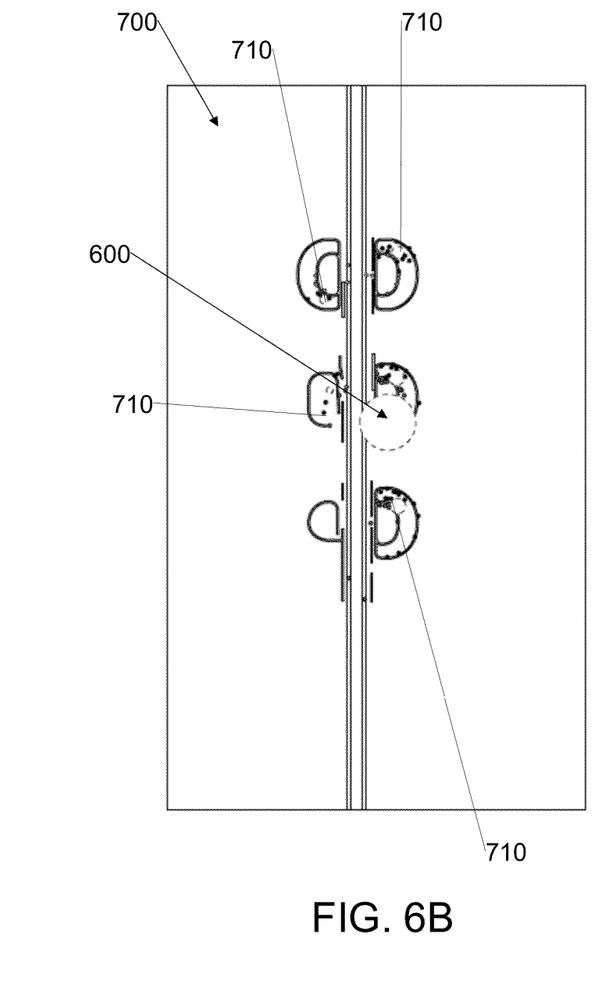

FIGS. 6A and 6B illustrate a commute location map 700 or portion of a commute location map 700 showing points of interest (POI) clustering 600. The POI cluster level 330 may include POI clusters 600 from aggregation of commute locations 710 and/or destination-based clusters 400 based on map features, such as POI clusters 600 combined based on, for example, POIs, airports, shopping malls, schools, or sports arenas. As illustrated in FIGS. 6A and 6B, the POI clusters 600 combines visits to a larger POI, like an airport 610 or a shopping mall. Rather than viewing the mobility of the user to individual entry points, the mobility pattern system 200 and/or the mobility pattern server 100 can classify the user as a frequent traveler to a specific destination. Using a map database, FIG. 6A illustrates combining a user visits and commute locations 710 to multiple terminals in an airport 610 and aggregating those locations into the one POI cluster 600 as specifically illustrated in FIG. 6B.

The temporal cluster level 340 may determine and identify clusters based on a time of day and/or day of the week (e.g. weekday, weekend, commute hours, daytime, nighttime, holidays). Once the data is clustered at these hierarchical levels, the various clusters and nodes can also be split into different layers based on temporal filtering and by temporal clustering 340. All of these clusters and the mobility graph can be built based on time of day, weekday-weekend or seasonality, commute hours, or holidays as selected or identified by the user. The temporal cluster level 340 may allow the mobility pattern system 200 and/or the mobility pattern server 100 to focus down to the user (or users in various regions) mobility behavior from several dimensions and apply the results to the areas of interest.

The regional cluster level 350 may include aggregated clusters based on the frequency used destinations for users in a zip code or other regional measurements, such as towns, cites, counties, and/or states.

Figure 7:
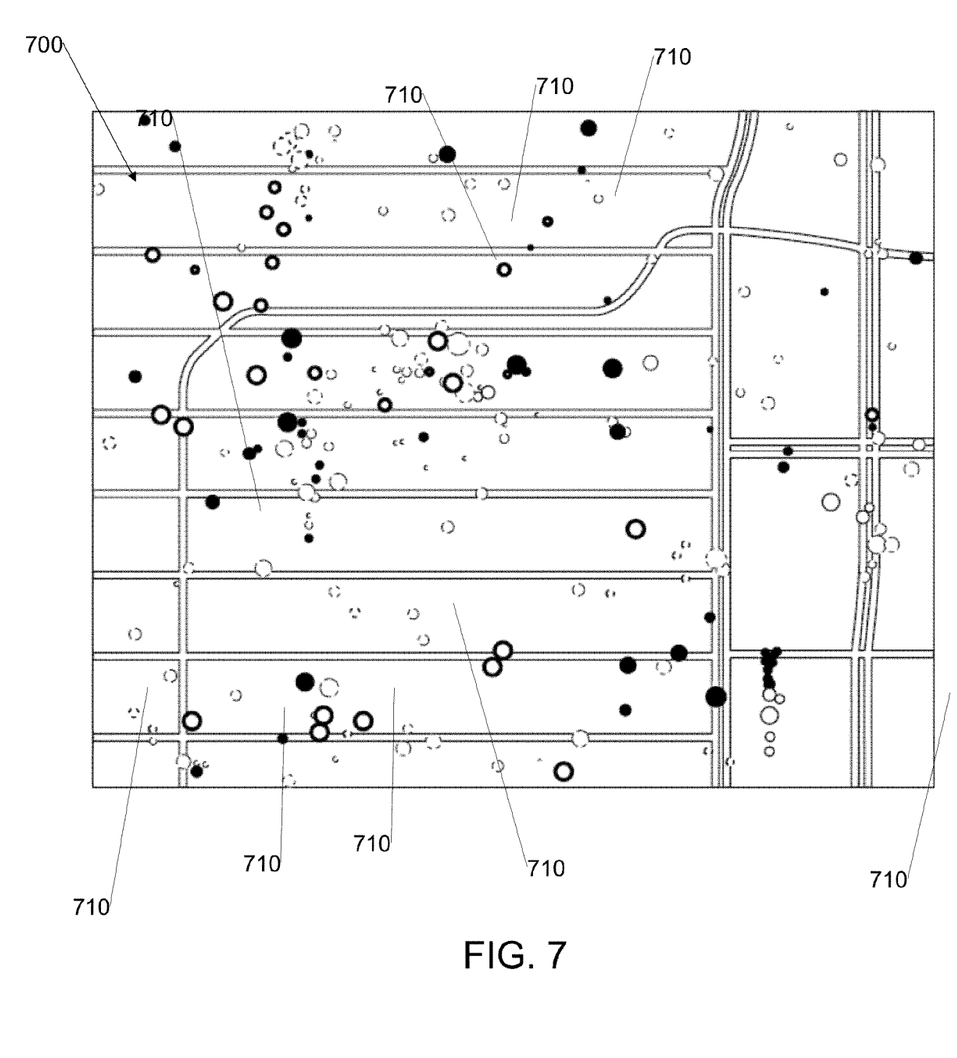
FIG. 7 is a diagram illustrating an exemplary commute location map for the mobility pattern system in accordance with one or more aspects described herein.

FIG. 7 illustrates an exemplary commute location map 700 for a user. The mobility pattern system 200 and/or the mobility pattern server 100 may generate a commute location map 700, which may consist of defining commute locations 710 using the commute location map 700 built from location data, such as origins, destinations, and waypoints from one or more users. As illustrated in FIG. 7, the commute locations 710 or origins/destinations/waypoints of the trips may be represented by a location icon. The location icon may be defined by one or more of the following: disks, symbols, squares, rectangles, points, stars, or other shapes. The commute locations 710 may be spatial clusters of destinations and then attached the closest origins. The origins may be captured when a user's in-vehicle device 240 is already in motion and above certain threshold speed, hence may not be used for defining the cluster locations. The commute locations 710 may be visualized as filled-in location icons with a shape proportional with the weight. The weight may be defined as the number of destinations and origins in the cluster. The commute locations 710 may also be colored location icons based on weight. The commute locations 710 may represent locations where users stay for a certain time. The size of the commute locations 710 may represent the number of times the user visited that destination and/or the length of time of the stay.

For a given user population, the mobility pattern system 200 and/or the mobility pattern server 100 may compute commute locations 710 as shown in FIG. 7. The size of the location icons for the commute locations 710 may illustrate the number of visits to the location and various colors or other identifications may be used to represent the type of commute location category based on the map data. The size of the location icons may be proportional to the location frequency for a given commute location 710. The magnitude of the location frequency may define the size of the location icons and visual representation of the location icons. As illustrated in FIG. 7, each location icon may represent the commute location 710 of a user, identified/colored by business type and of size proportional to the location frequency of the commute. FIG. 7 may provide a commute location map 700 and a visualization that allows the mobility pattern system 200 and/or the mobility pattern server 100 to understand the distribution of commute location categories in a given user population for a given spatial region and to understand the users' behaviors and interests.

Figure 8:
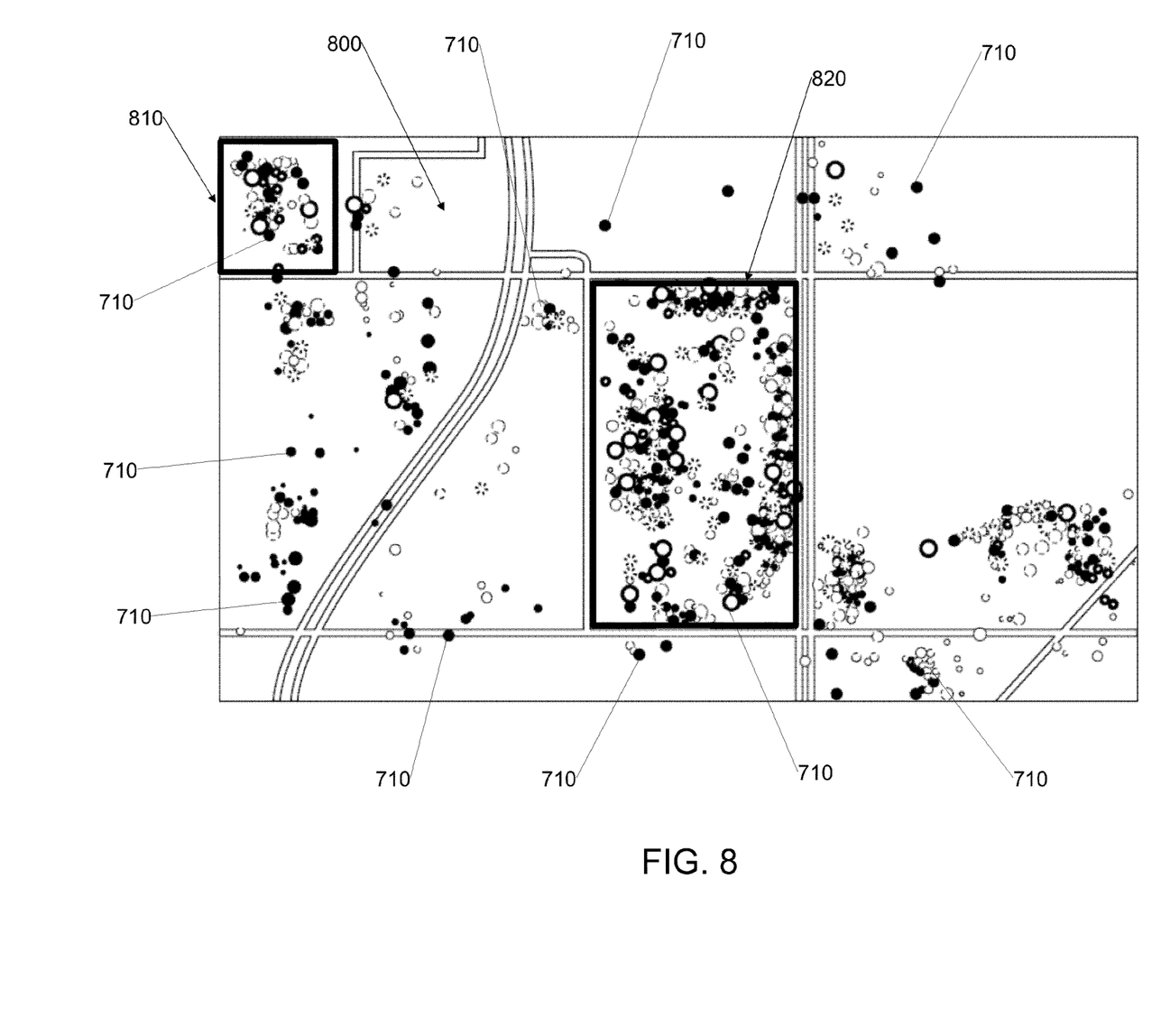
FIG. 8 is a diagram illustrating another exemplary commute location map for the mobility pattern system in accordance with one or more aspects described herein.

FIG. 8 illustrates another exemplary commute location map 800. The commute location map 800 illustrated in FIG. 8 provides another view of the commute location data 710 to visualize a distance travelled by the users from their home location and also the time of stay in these destinations. For example, this commute location map 800 and commute location data 710 may help to understand the risks associated with the user based on distance traveled in determining their insurance premiums. In FIG. 8, the commute locations 710 may include a color or other identification, such as color gradients, bolding of lines, dotted lines, dashed lines, shaded interior, etc. This color or other identification may illustrate the commute locations 710 and may represent a distance between the users that are traveling to these destinations, such as closer locations or shorter commutes are represented with a first color and further locations or longer commutes are represented with a second color different than the first color. For example, a fitness center 810 as represented in the top left corner, may consist of people visiting from short distances and may be colored with a first color, while a shopping mall 820, represented in the middle of the commute location map 800, may attract people from faraway locations. These distinctions and identifications can be a valuable input for the businesses as well as for insurance companies. Additional attributes like the length of stay at these commuter locations can also be visualized and used for specific use cases in understanding the turnover of visitors at a given location.

The size and color of the location icons and visual representation of the location icons is just one way to represent the location frequency and distance respectively. For example, the color of the location icons could represent the location frequency and the size of the location icons could represent or encode the distance.

The commute location map 700 and/or commute locations 710 may be used by an insurance industry to assess the travel risks associated with this user, by a telematics service company to offer major traffic related alerts in a particular region. The commute location map 700 and/or commute locations 710 may also be analyzed and separated into weekday vs weekend times, day vs night times, commute times, holiday times, etc. to offer refined services.

In another embodiment, the mobility pattern system 200 and/or the mobility pattern server 100 may be utilized to build an aggregate commute location map 700 for a homogenous collection of users. A collection of users may be defined for example, as the people living in a particular zip code. The collection of users and zip codes may be obtained based on the garage address used in their insurance policies or from other public data sources. The aggregate commute location map 700 may be constructed from individual user commute location maps by clustering most frequently visited commute locations 710.

The mobility pattern system 200 and/or the mobility pattern server 100 and region of mobility may be utilized to solve various problems. For example, the mobility pattern system 200 and/or the mobility pattern server 100 and commute location map 700 and/or commute locations 710 in combination with risk maps may be used for risk index calculation and for insurance pricing both at an individual level and an aggregate level. In another example, the mobility pattern system 200 and/or the mobility pattern server 100 and commute location map 700 and/or commute locations 710 may quantify the changes in mobility patterns due to certain events. Further, the mobility pattern system 200 and/or the mobility pattern server 100 and commute location map 700 and/or commute locations 710 may be utilized for discovering and quantifying types of users based on the size and density of the commute locations 710.

Figure 9:
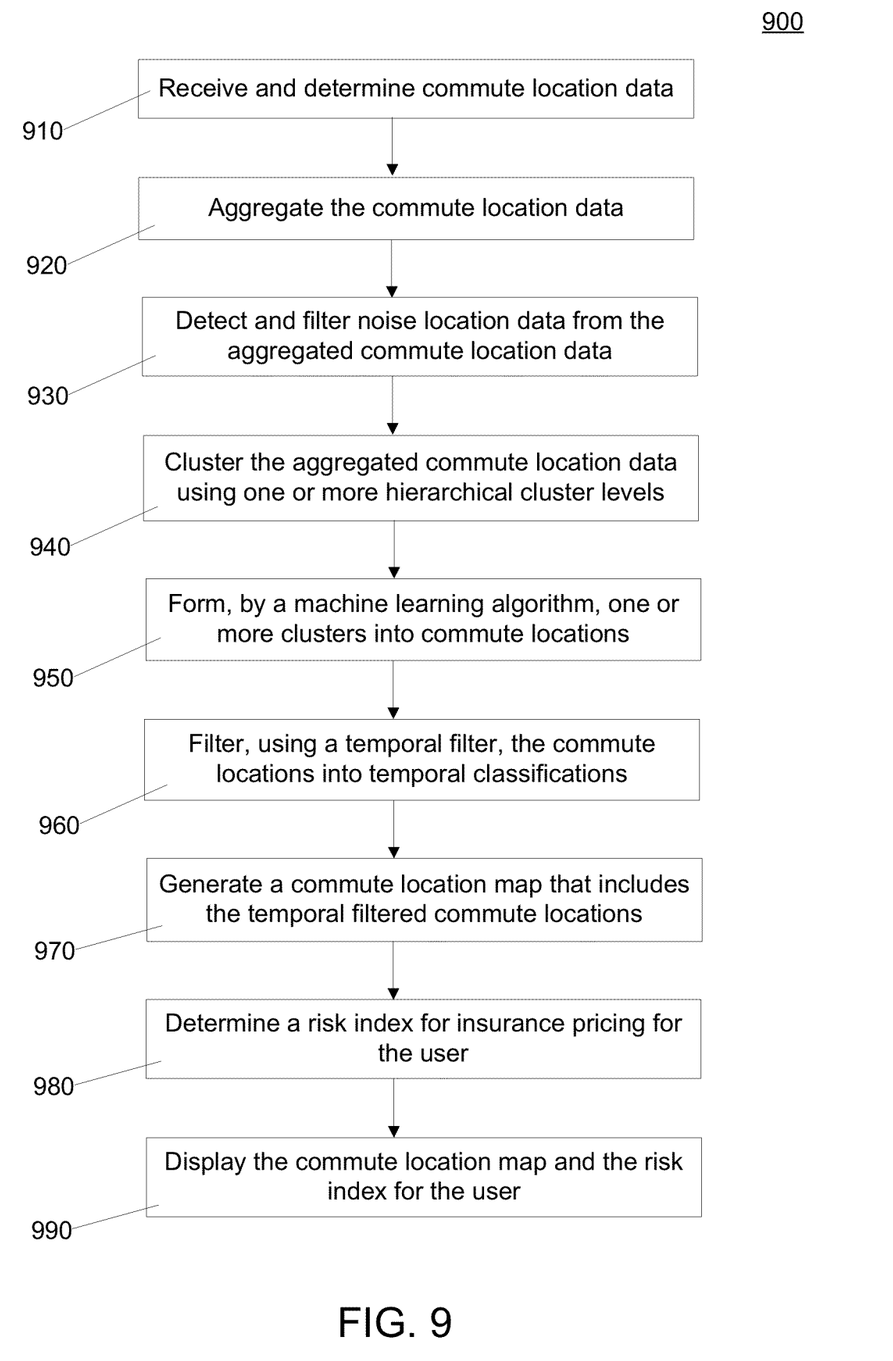
FIG. 9 illustrates an exemplary method for the mobility pattern system in accordance with one or more aspects described herein.

FIG. 9 illustrates an example method 900 according to an embodiment as disclosed herein. In some embodiments, method 900 may be performed by the mobility pattern system 200 and/or the mobility pattern server 100. It should be understood that the method of FIG. 9 is designed to illustrate various features and aspects of the system, and not to limit the functionality of the system.

At step 910, the mobility pattern system 200 and/or the mobility pattern server 100 may receive and determine commute location data. The commute location data may include a plurality of trips by a user between a plurality of origins, a plurality of destinations, and a plurality of waypoints in between each of the corresponding origins and destinations. The commute location data may be received from one or more sensors from a mobile device for the user. At step 920, the mobility pattern system 200 and/or the mobility pattern server 100 may aggregate the commute location data.

At step 930, the mobility pattern system 200 and/or the mobility pattern server 100 may detect and filter noise location data from the aggregated commute location data. The noise location data may be defined as inaccuracies from the one or more sensors and the commute location data.

At step 940, the mobility pattern system 200 and/or the mobility pattern server 100 may cluster the aggregated cluster location data using one or more hierarchical cluster levels. The one or more hierarchical cluster levels may include one or more of the following: a destination-based cluster level, a spatial aggregation layer cluster level, a temporal cluster level, a point of interest based cluster level, or a regional cluster level.

At step 950, the mobility pattern system 200 and/or the mobility pattern server 100 may form, by a machine learning algorithm, one or more location clusters into commute locations from the aggregated commute location data. The forming of the location clusters may be based the one or more hierarchical cluster levels.

At step 960, the mobility pattern system 200 and/or the mobility pattern server 100 may filter, using a temporal filter, the commute locations into temporal classifications. The one or more temporal classifications may include filtering the plurality of commute locations based on a time of day window for each of the plurality of commute locations. The time of day window may include morning, day, evening, and night. The one or more temporal classifications may include filtering the plurality of commute locations based on a minimum number of visits per time period (such as per hour, per day, per week, per month, per quarter, or other time periods) to each of the plurality of commute locations. The one or more temporal classifications may include filtering the plurality of commute locations based on a maximum time of stay at each of the plurality of commute locations.

At step 970, the mobility pattern system 200 and/or the mobility pattern server 100 may generate a commute location map that includes a plurality of location icons. The location icons may be defined by a visual representation of one or more of the following: disks, symbols, squares, rectangles, points, stars, or other shapes. Each of the plurality of location icons may represent the temporal filtered commute locations. Each of the location icons may include a size that defines and is proportional to a location frequency that the user visits a specific location associated with each of the plurality of commute locations. The size of the location icons may be proportional to the location frequency for a given commute location 710. The magnitude of the location frequency may define the size of the location icons and visual representation of the location icons. The size may be larger when the location frequency is more frequent and the size may be smaller when the location frequency is less frequent. Additionally, each of location icons of the commute locations may include a color that represents a distance between the users that are commuting to these commute locations. The color may include a first color and a second color different from the first color. The first color may define a shorter distance to the commute location. The second color may define a longer distance to the commute location. The size and color of the location icons and visual representation of the location icons is just one way to represent the location frequency and distance respectively. For example, the color of the location icons could represent the location frequency and the size of the location icons could encode the distance.

At step 980, the mobility pattern system 200 and/or the mobility pattern server 100 may determine a risk index for the user based on the commute location map of the user and a risk map. The risk index may be used for insurance pricing for the user.

At step 990, the mobility pattern system 200 and/or the mobility pattern server 100 may cause display of the commute location map and the risk index for the user. A display with a user interface connected to the mobility pattern system 200 and/or the mobility pattern server 100 may display the commute location map and the risk index for the user Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A system comprising:
   a processor;
   a display with a user interface; and
   a memory unit storing computer-executable instructions, which when executed by the processor, cause the system to:
   receive and determine commute location data that includes a plurality of trips by a user between a plurality of origins, a plurality of destinations, and a plurality of waypoints in between each of the plurality of origins and the plurality of destinations;
   aggregate the commute location data;
   cluster the aggregated commute location data using one or more cluster levels;
   form, by a machine learning algorithm operating on the processor, one or more location clusters into a plurality of commute locations from the aggregated commute location data and based on the one or more cluster levels;
   filter, using a temporal filter, the plurality of commute locations, into one or more temporal classifications;
   generate a commute location map that includes a plurality of location icons, wherein each of the plurality of location icons represents each of the temporal filtered plurality of commute locations, wherein the plurality of commute locations is defined from the one or more location clusters;
   determine a risk index for the user based on the commute location map and a risk map, wherein the risk index is used for insurance pricing for the user; and
   display, via the user interface, the commute location map and the risk index for the user.

2. The system of claim 1, wherein the commute location data is received from one or more sensors from a mobile device for the user.

3. The system of claim 2, wherein the memory unit storing computer-executable instructions, which when executed by the processor, further cause the system to:
   detect and filter out noise location data from the commute location data, wherein the noise location data is defined as inaccuracies from the one or more sensors and the commute location data.

4. The system of claim 1, wherein the one or more temporal classifications includes filtering the plurality of commute locations based on a time of day window for each of the plurality of commute locations.

5. The system of claim 4, wherein the time of day window includes morning, day, evening, and night.

6. The system of claim 1, wherein the one or more temporal classifications include filtering the plurality of commute locations based on a minimum number of visits per time period to each of the plurality of commute locations.

7. The system of claim 1, wherein the one or more temporal classifications include filtering the plurality of commute locations based on a maximum time of stay at each of the plurality of commute locations.

8. The system of claim 1, wherein the one or more cluster levels includes hierarchical clusters levels of one or more of the following: a destination-based cluster level, a spatial aggregation layer cluster level, a temporal cluster level, a point of interest based cluster level, or a regional cluster level.

9. The system of claim 1, wherein each of the location icons for the plurality of commute locations includes a size that is proportional to a location frequency that the user visits a specific location associated with each of the plurality of commute locations, wherein the size is larger when the location frequency is more frequent and the size is smaller when the location frequency is less frequent.

10. The system of claim 1, wherein each of the location icons for the plurality of commute locations includes a color that represents a distance the user is commuting to these commute locations, wherein the color includes a first color and a second color different from the first color, the first color defining a shorter distance to the commute location and the second color defining a longer distance to the commute location.

11. A computer-implemented method comprising:
at a mobility pattern system:
receive and determine, by a processor and a memory unit storing computer-executable instructions operating on the mobility pattern system, commute location data that includes a plurality of trips by a user between a plurality of origins, a plurality of destinations, and a plurality of waypoints in between each of the plurality of origins and the plurality of destinations, wherein the commute location data is received from one or more sensors from a mobile device for the user;
aggregate, by the processor, the commute location data;
detect and filter out, by the processor, noise location data from the commute location data, wherein the noise location data is defined as inaccuracies from the one or more sensors and the commute location data;
cluster, by the processor, the aggregated commute location data using one or more cluster levels;
form, by a machine learning algorithm operating on the processor, one or more location clusters into a plurality of commute locations from the aggregated commute location data and based on the one or more cluster levels;
filter, using a temporal filter, the plurality of commute locations, into one or more temporal classifications;
generate, by the processor, a commute location map that includes a plurality of location icons, wherein each of the plurality of location icons represents each of the temporal filtered plurality of commute locations, wherein the plurality of commute locations is defined from the one or more location clusters; and
display, by the processor via a user interface connected to the processor, the commute location map for the user.

12. The method of claim 11, wherein the one or more temporal classifications includes filtering the plurality of commute locations based on a time of day window for each of the plurality of commute locations, and wherein the time of day window includes morning, day, evening, and night.

13. The method of claim 11, wherein the one or more temporal classifications include filtering the plurality of commute locations based on a minimum number of visits per month to each of the plurality of commute locations.

14. The method of claim 11, wherein the one or more temporal classifications include filtering the plurality of commute locations based on a maximum time of stay at each of the plurality of commute locations.

15. The method of claim 11, wherein the one or more cluster levels includes hierarchical clusters levels of one or more of the following: a destination-based cluster level, a spatial aggregation layer cluster level, a temporal cluster level, a point of interest based cluster level, or a regional cluster level.

16. The method of claim 11, further including the step of:
determine, by the processor, a risk index for the user based on the commute location map and a risk map, wherein the risk index is used for insurance pricing for the user.

17. The method of claim 11, wherein each of the location icons for the plurality of commute locations includes one of a size or a color that represents a distance the user is commuting to these commute locations and wherein each of the location icons for the plurality of commute locations includes the other of the size or the color that is proportional to a location frequency that the user visits a specific location associated with each of the plurality of commute locations.

18. One or more non-transitory computer-readable media storing instructions that, when executed by a computing device, cause the computing device to:
receive and determine, by a processor operating on the computing device, commute location data that includes a plurality of trips by a user between a plurality of origins, a plurality of destinations, and a plurality of waypoints in between each of the plurality of origins and the plurality of destinations, wherein the commute location data is received from one or more sensors from a mobile device for the user;
aggregate, by the processor, the commute location data;
cluster, by the processor, the aggregated commute location data using one or more cluster levels;
form, by a machine learning algorithm operating on the processor, one or more location clusters into a plurality of commute locations from the aggregated commute location data and based on the one or more cluster levels;
filter, using a temporal filter, the plurality of commute locations, into one or more temporal classifications, wherein the one or more temporal classifications include one or more of: filtering the plurality of commute locations based on a time of day window for each of the plurality of commute locations, filtering the plurality of commute locations based on a minimum number of visits per month to each of the plurality of commute locations, or filtering the plurality of commute locations based on a maximum time of stay at each of the plurality of commute locations;
generate, by the processor, a commute location map that includes a plurality of location icons, wherein each of the plurality of location icons represents each of the temporal filtered plurality of commute locations, wherein the plurality of commute locations is defined from the one or more location clusters; and
display, by the processor via a user interface connected to the processor, the commute location map for the user.

19. The one or more non-transitory computer-readable media storing instructions of claim 18, wherein each of the location icons for the plurality of commute locations includes one of a color or a size that represents a distance the user is commuting to these commute locations and wherein each of the location icons for the plurality of commute locations includes the other of the color or the size that is proportional to a location frequency that the user visits a specific location associated with each of the plurality of commute locations.

20. The one or more non-transitory computer-readable media storing instructions of claim 18, further causing the computing device to:
detect and filter out, by the processor, noise location data from the commute location data, wherein the noise location data is defined as inaccuracies from the one or more sensors and the commute location data.

* * * * *